United States Patent
Sakano et al.

(10) Patent No.: US 9,987,593 B2
(45) Date of Patent: Jun. 5, 2018

(54) METHOD FOR PRODUCING NOX STORAGE-REDUCTION CATALYST

(71) Applicant: TOYOTA JIDOSHA KABUSHIKI KAISHA, Toyota-shi, Aichi-ken (JP)

(72) Inventors: Mitsuru Sakano, Toyota (JP); Shohei Kawamura, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days. days.

(21) Appl. No.: 15/647,594

(22) Filed: Jul. 12, 2017

(65) Prior Publication Data
US 2018/0043306 A1    Feb. 15, 2018

(30) Foreign Application Priority Data
Aug. 9, 2016 (JP) .................. 2016-156923

(51) Int. Cl.
| | |
|---|---|
| *B01J 23/04* | (2006.01) |
| *B01D 53/94* | (2006.01) |
| *B01J 35/00* | (2006.01) |
| *B01J 37/00* | (2006.01) |
| *B01J 37/02* | (2006.01) |

(52) U.S. Cl.
CPC ...... *B01D 53/9422* (2013.01); *B01J 35/0006* (2013.01); *B01J 37/0072* (2013.01); *B01J 37/0248* (2013.01); *B01D 2255/2022* (2013.01)

(58) Field of Classification Search
USPC .................................. 502/173, 344
See application file for complete search history.

(56) References Cited

U.S. PATENT DOCUMENTS

| | | | | |
|---|---|---|---|---|
| 6,090,940 | A | * | 7/2000 | Sugi ............... C07D 251/20 544/223 |
| 7,884,163 | B2 | * | 2/2011 | McDaniel ............ C08F 10/02 502/103 |
| 2008/0166427 | A1 | * | 7/2008 | Nomura ............ A61K 31/4412 424/649 |
| 2017/0240741 | A1 | * | 8/2017 | Ichihara ................. C08L 69/00 |

FOREIGN PATENT DOCUMENTS

JP    2002-191989 A    7/2002

* cited by examiner

*Primary Examiner* — Patricia L. Hailey
(74) *Attorney, Agent, or Firm* — Oliff PLC

(57) ABSTRACT

An object of the present disclosure is to provide a method for producing a NOx storage-reduction catalyst capable of inhibiting decreases in NOx purification performance following exposure to high temperatures. The present disclosure achieves the aforementioned object with a method for producing a NOx storage-reduction catalyst, comprising: (A) supporting potassium compound particles on catalyst support particles by using an potassium dispersed water containing the potassium compound particles, and (B) calcining the catalyst support particles supporting the potassium compound particles; wherein, the potassium compound particles are at least one type selected from the group consisting of oteracil potassium, potassium tetranitroacridone, potassium tetraphenylborate, and potassium tetranitrophenothiazine-9-oxide.

12 Claims, 6 Drawing Sheets

FIG. 4A

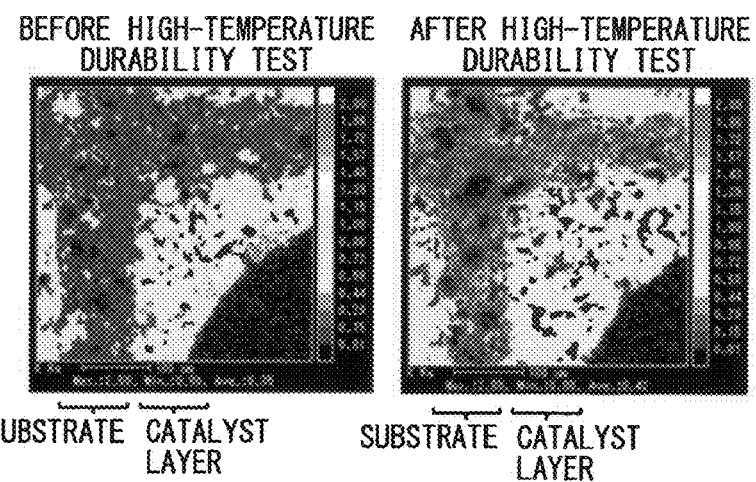

BEFORE HIGH-TEMPERATURE DURABILITY TEST / AFTER HIGH-TEMPERATURE DURABILITY TEST

SUBSTRATE  CATALYST LAYER    SUBSTRATE  CATALYST LAYER

FIG. 4B

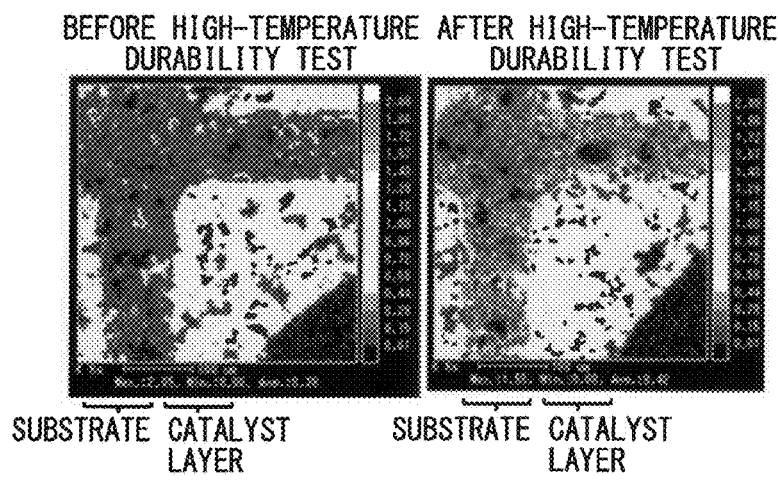

BEFORE HIGH-TEMPERATURE DURABILITY TEST / AFTER HIGH-TEMPERATURE DURABILITY TEST

SUBSTRATE  CATALYST LAYER    SUBSTRATE  CATALYST LAYER

FIG. 4C

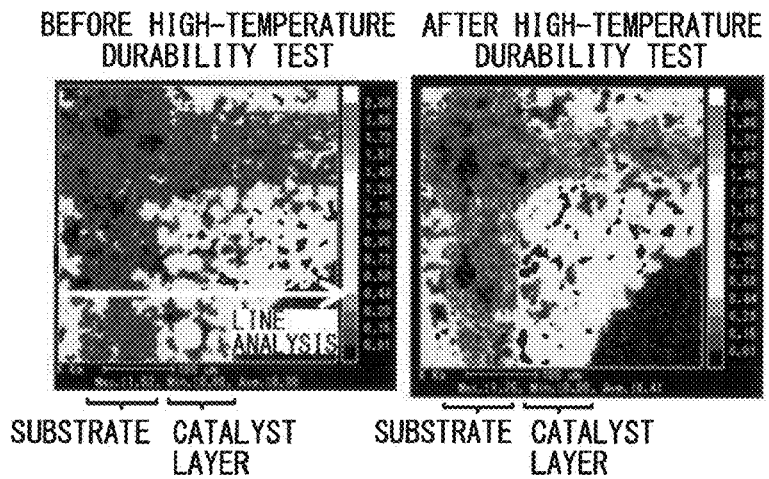

BEFORE HIGH-TEMPERATURE DURABILITY TEST / AFTER HIGH-TEMPERATURE DURABILITY TEST

SUBSTRATE  CATALYST LAYER    SUBSTRATE  CATALYST LAYER

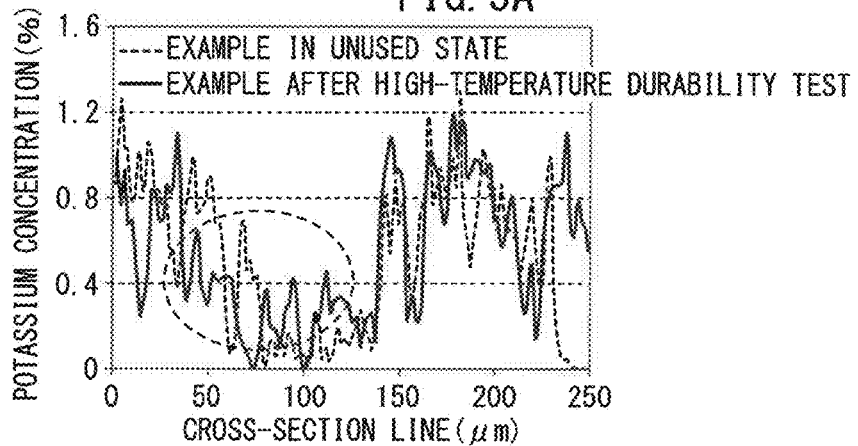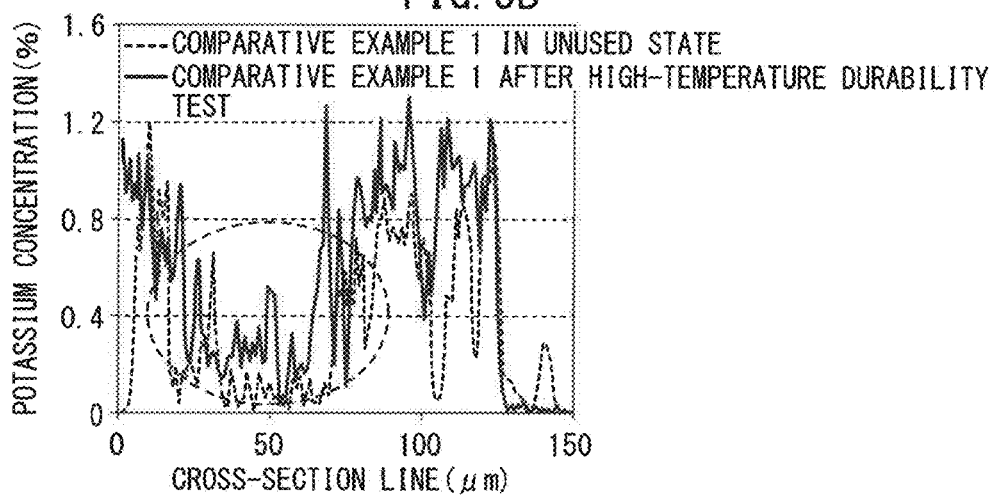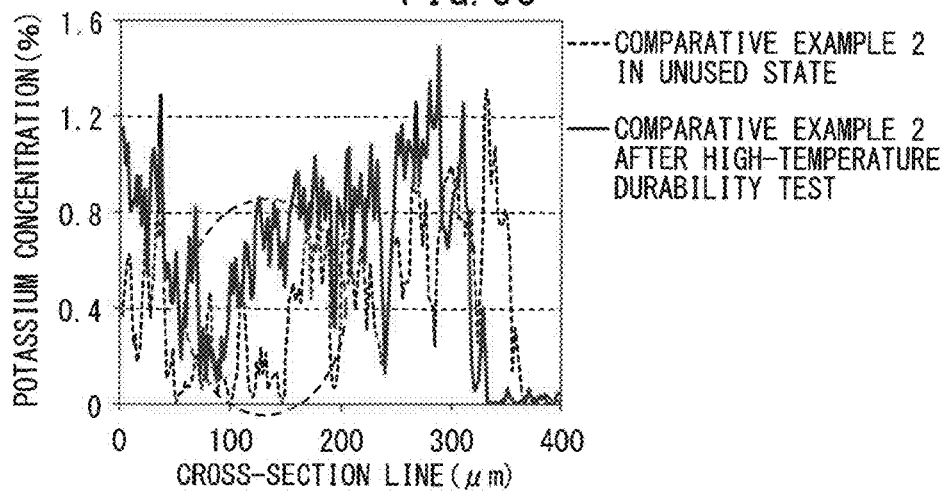

US 9,987,593 B2

METHOD FOR PRODUCING NOX STORAGE-REDUCTION CATALYST

TECHNICAL FIELD

The present disclosure relates to a method for producing a NOx storage-reduction catalyst.

BACKGROUND OF THE INVENTION

NOx storage-reduction catalysts have come to be used practically as catalysts for purifying exhaust gas from lean-burning engines. In these NOx storage-reduction catalysts, NOx are stored in a NOx storage material when engine operation is on the fuel lean side, by pulsed control of the air-fuel ratio such that the air-fuel ratio is varied from the fuel lean side to the stoichiometric to fuel rich side. The stored NOx is then released on the stoichiometric to rich side and purified by reacting with a reducing component such as HC or CO due to the catalytic action of a precious metal.

Example of a NOx storage-reduction catalyst usually include a catalyst in which a catalyst layer containing a catalytic metal such as platinum (Pt), palladium (Pd) or rhodium (Rh) formed on a honeycomb substrate made of cordierite and the like and a NOx storage material containing an element such as an alkaline metal, alkaline earth metal or rare earth element supported on the catalyst layer. In addition, potassium compounds and barium compounds are typically used for the NOx storage material from the viewpoint of their high NOx storage performance.

Japanese Unexamined Patent Publication No. 2002-191989 discloses a NOx storage-reduction catalyst in which a poorly water-soluble hydrogen tartrate salt (potassium hydrogen tartrate) is used as the NOx storage material and the NOx storage material is only supported on catalyst support particles having a high specific surface area, and thereby preventing the elution of the NOx storage material and the migration thereof to catalyst support particles having a low specific surface area when exposed to high temperatures.

SUMMARY OF THE INVENTION

Problems to be Solved by the Disclosure

However, in a conventional NOx storage-reduction catalyst in the manner of Japanese Unexamined Patent Publication No. 2002-191989, if the catalyst is subjected to a high-temperature state produced by a lean-burning engine, the NOx storage-reduction catalyst deteriorates following exposure to high temperatures and the NOx purification rate thereof ends up decreasing. Consequently, an object of the present disclosure is to provide a method for producing a NOx storage-reduction catalyst capable of inhibiting decreases in NOx purification performance following exposure to high temperatures.

Features for Solving the Problems

Aspects of the present disclosure are as indicated below.
A first aspect relates to a method for producing a NOx storage-reduction catalyst, comprising:
(A) supporting potassium compound particles on catalyst support particles by using a potassium dispersed water containing the potassium compound particles, and
(B) calcining the catalyst support particles supporting the potassium compound particles;
wherein the potassium compound particles are at least one type selected from the group consisting of oteracil potassium, potassium tetranitroacridone, potassium tetraphenylborate, and potassium tetranitrophenothiazine-9-oxide.

A second aspect relates to the method according to the first aspect, comprising supporting a catalytic metal on the catalyst support particles before the step (A), between the step (A) and the step (B), or after the step (B).

A third aspect relates to the method according to the second aspect, further comprising:
supporting the catalytic metal on the catalyst support particles before the step (A), and
preparing a slurry by mixing the potassium dispersed water with the catalyst support particles having the catalytic metal supported thereon, to support the potassium compound particles on the catalyst support particles in the step (A).

A forth aspect relates to the method according to the first through third aspects, further comprising coating the catalyst support particles supporting the potassium compound particles, on a honeycomb substrate, between the step (A) and the step (B).

A fifth aspect relates to the method according to the first through forth aspects, wherein the average particle diameter of the calcined potassium compound particles is from 20 nm to 50 nm after the step (B).

Effects of the Disclosure

According to the present disclosure, a method can be provided for producing a NOx storage-reduction catalyst capable of inhibiting decreases in NOx purification performance following exposure to high temperatures.

BRIEF DESCRIPTION OF THE DRAWINGS

FIGS. 4A, 4B, and 4C indicate the potassium atoms distribution image obtained by EPMA in an unused state and after a high-temperature durability test in Example, Comparative Example 1, and Comparative Example 2, respectively.

FIGS. 5A, 5B, and 5C indicate the results of a line analysis of potassium atoms distribution in an unused state and after a high-temperature durability test in Example, Comparative Example 1, and Comparative Example 2, respectively.

DETAILED DESCRIPTION OF THE INVENTION

The following provides an explanation of the method for producing a NOx storage-reduction catalyst in various embodiments of the present disclosure.

The method for producing a NOx storage-reduction catalyst in one embodiment of the present disclosure comprises: (A) supporting potassium compound particles on catalyst support particles by using a potassium dispersed water containing the potassium compound particles, and (B) calcining the catalyst support particles supporting the potassium compound particles; wherein, the potassium compound particles are at least one type selected from the group consisting of oteracil potassium, potassium tetranitroacridone, potassium tetraphenylborate, and potassium tetranitrophenothiazine-9-oxide.

A conventional NOx storage-reduction catalysts end up deteriorating as a result of going through a high-temperature state (of, for example, 800° C.) produced by a lean-burning engine and the like, thereby resulting in the problem of undergoing a considerable decrease in the NOx purification rate thereof. Therefore, as a result of focusing on NOx storage materials, the inventors of the present disclosure obtained the novel finding that a potassium-containing NOx storage material such as potassium carbonate present in a catalyst layer ends up migrating into a honeycomb substrate as a result of being exposed to high temperatures, and the amount of potassium-containing NOx storage material in the catalyst layer following exposure to high temperatures ends up decreasing in comparison with the amount prior to high-temperature exposure. Since NOx storage material in the honeycomb substrate does not contribute to NOx storage, the inventors of the present disclosure have believed that NOx storage performance and NOx purification rate decrease due to the reduction in the amount of potassium-containing NOx storage material in the catalyst layer following exposure to high temperatures.

Therefore, as a result of conducting extensive studies, the inventors of the present disclosure found that, by using a NOx storage-reduction catalyst for which there is little migration of NOx storage material from the catalyst layer to the honeycomb substrate even when making it to exposure to high temperatures, NOx storage performance following exposure to high temperatures can be maintained and decreases in NOx purification rate can be inhibited.

The mechanism by which a catalyst produced according to the production method of one embodiment of the present disclosure is able to inhibit decreases in NOx purification rate following exposure to high temperatures is presumed to be as indicated below.

Figure 1A:
FIGS. 1A, 1B, and 1C are a conceptual drawing of methods for producing NOx storage-reduction catalysts of Example and Comparative Examples 1 and 2, respectively.
Figure 1B:
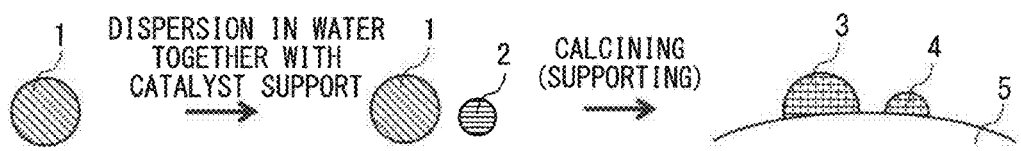

In the case of using potassium hydrogen tartrate (solubility in water: 600 mg/100 ml $H_2O$) for the raw material of a NOx storage material in the manner of Japanese Unexamined Patent Publication No. 2002-191989, although the potassium hydrogen tartrate is poorly soluble in water, a portion thereof ends up dissolving in water when preparing a slurry, and resulting in the formation of potassium ions. Consequently, when the slurry is calcined and the potassium ions are converted to potassium carbonate, the particles of the potassium carbonate formed are small (FIG. 1B). In this case, since these particles have the property of nanoparticles in that the melting point lowers as the particles become smaller, it is believed the melting point of the potassium carbonate is lower than the normal melting point thereof (891° C.). As a result, the potassium carbonate easily melts at high temperatures (such as 800° C.) and the molten potassium carbonate ends up migrating from the catalyst layer to the honeycomb substrate.

Figure 1C:
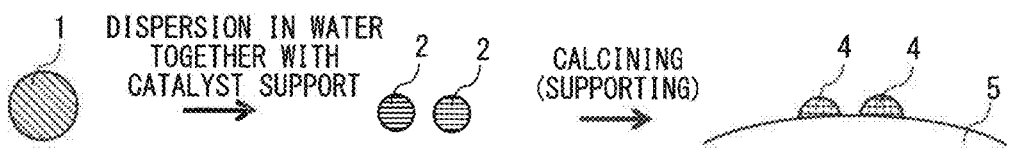

In addition, since potassium dissolves in water resulting in the formation of potassium ions when preparing a slurry in the same manner as conventional water absorption supporting methods, the potassium carbonate particles formed by subsequent calcining are also small (FIG. 1C). Thus, as described above, the melting point is predicted to lower and the potassium carbonate ends up melting at high temperatures causing it to migrate from the catalyst layer to the honeycomb substrate.

In contrast, the method for producing a NOx storage-reduction catalyst in one embodiment of the present disclosure uses potassium compound particles of at least one type selected from the group consisting of oteracil potassium, potassium tetranitroacridone, potassium tetraphenylborate, and potassium tetranitrophenothiazine-9-oxide as the raw material of the NOx storage material. Since these potassium compound particles are insoluble in water, there is hardly any formation of potassium ions when preparing a slurry. In other words, particles of potassium carbonate formed by calcining can be made to be larger than those formed by conventional methods (FIG. 1A). In this case, since there is hardly any lowering of melting point, the potassium carbonate substantially does not melt even if subjected to a high-temperature state (of, for example, 800° C.) and potassium carbonate can be inhibited from migrating from the catalyst layer to the honeycomb substrate. Thus, the potassium carbonate is retained in the catalyst layer even after exposure to high temperatures, or in other words, decreases in NOx purification rate following exposure to high temperatures are presumed to be able to be inhibited by reducing the amount of NOx storage material that migrates before and after exposure to high temperatures.

The potassium compound particles in one embodiment of the present disclosure serve as the raw material of the NOx storage material, and are converted to potassium-containing NOx storage material particles such as potassium carbonate as a result of being calcined. Since the potassium compound particles in one embodiment of the present disclosure are insoluble in water, migration of the potassium-containing NOx storage material particles to the honeycomb substrate attributable to exposure to high temperatures can be inhibited, and a larger number of potassium-containing NOx storage material particles are able to remain in the catalyst layer following exposure to high temperatures.

The potassium compound particles in one embodiment of the present disclosure refer to potassium compound particles of oteracil potassium, potassium tetranitroacridone, potassium tetraphenylborate (solubility in water: 0.18 mg/100 ml $H_2O$) or potassium tetranitrophenothiazine-9-oxide and arbitrary combinations thereof, and these potassium compound particles are substantially insoluble in water. Since the potassium compound particles is substantially insoluble in water, conversion to potassium ions is inhibited, thereby making it possible to inhibit the formation of potassium-containing NOx storage material particles having a small particle diameter.

With respect to the present disclosure, insolubility in water refers to solubility in water of 100 mg/100 ml $H_2O$ or less under standard conditions. Solubility in water of "100 mg/100 $H_2O$ or less" means that 100 mg of a compound dissolve in 100 ml of water. By making the solubility in water of the potassium compound particles used in one embodiment of the present disclosure to be 100 mg/100 ml $H_2O$ or less, the potassium compound particles are less soluble in water than potassium tartrate (solubility in water: 600 mg/100 ml $H_2O$), thereby preventing the particles from entering a state of potassium ions. As a result, the particle diameter of the potassium carbonate formed after calcining can be made to be larger than that when using potassium tartrate. In addition, solubility in water of the potassium compound particles is preferably 50 mg/100 ml $H_2O$ or less and more preferably 10 mg/100 ml $H_2O$ or less. This is because lower solubility in water makes it possible to inhibit the potassium compound particles from being dispersed in an ionic state.

Step (A)

In step (A) in one embodiment of the present disclosure, the raw material of the NOx storage material in the form of potassium compound particles are supported on catalyst support particles using a potassium dispersed water containing potassium compound particles.

The potassium compound particles of one embodiment of the present disclosure are contained in the potassium dispersed water in one embodiment of the present disclosure. Elements of compounds typically known as NOx storage materials in the technical field of NOx purification catalysts may also be contained in addition to the potassium compound particles used in one embodiment of the present disclosure. Examples thereof can include alkaline metals such as lithium (Li), sodium (Na), rubidium (Rb) or cesium (Cs), alkaline earth metals such as beryllium (Be), magnesium (Mg), calcium (Ca), strontium (Sr) or barium (Ba), rare earth elements such as scandium (Sc), yttrium (Y), lanthanum (La), cerium (Ce), praseodymium (Pr), neodymium (Nd), dysprosium (Dy) or ytterbium (Yb), and arbitrary combinations thereof.

In one embodiment of the present disclosure, the percentage of potassium compound particles such as oteracil potassium particles in the potassium compound used to obtain a potassium-containing NOx storage material is preferably 50 mol % or more, more preferably 70 mol % or more, even more preferably 90 mol % or more and still more preferably 95 mol % or more. This is because a higher percentage of potassium compound particles such as oteracil potassium particles makes it possible to reduce the percentage of NOx storage material able to migrate to the honeycomb substrate as a result of exposure to high temperatures, thereby making it possible to further inhibit decreases in NOx storage performance following exposure to high temperatures.

There are no particular limitations on the catalyst support particles used in one embodiment of the present disclosure, and any arbitrary metal oxide typically known to be used as catalyst support particles in the technical field of NOx purification catalysts can be used. Examples thereof can include alumina ($Al_2O_3$), silica ($SiO_2$), silica-alumina ($SiO_2$—$Al_2O_3$), ceria ($CeO_2$), zirconia ($ZrO_2$), ceria-zirconia ($CeO_2$—$ZrO_2$), titania ($TiO_2$) and combinations thereof. From the viewpoint of oxygen storage capacity (OSC), the catalyst support particles preferably contain ceria ($CeO_2$) or ceria-zirconia ($CeO_2$—$ZrO_2$), and more preferably consist of $Al_2O_3$—$ZrO_2$—$TiO_2$ complex oxide.

The catalyst support particles can further contain an additional metal element. For example, the catalyst support particles can further contain at least one type of metal element selected from the group consisting of alkaline earth metals and rare earth elements. Specific examples thereof can include barium (Ba), lanthanum (La), yttrium (Y), praseodymium (Pr), neodymium (Nd) and combinations thereof. Incorporation of such additional metal elements makes it possible to remarkably improve heat resistance of the catalyst support particles.

There are no particular limitations on the method used to support particles of a NOx storage material other than the potassium compound particles on the catalyst support particles, and a method typically used to support NOx storage material particles on catalyst support particles in the technical field of NOx purification catalysts can be used. Examples of the method include an impregnation method consisting of supporting NOx storage material by impregnating catalyst support particles into an aqueous solution containing an acetate or nitrate of the metal that composes the NOx storage material, a co-precipitation method consisting of adding a basic substance such as aqueous ammonia to the aqueous solution to co-precipitate the NOx storage material followed by subjecting the resulting precipitate to heat treatment, and a method consisting of adding a reducing agent such as an alcohol to the aqueous solution and heating as necessary while simultaneously reducing ions of each metal element contained in the aqueous solution. Among these, mixing the aqueous solution with the catalyst support particles to prepare a slurry followed by supporting the potassium compound particles on the catalyst support particles is preferable from the viewpoint of facilitating dispersion of the potassium compound particles on the surface of the catalyst support particles.

The supported amount of potassium compound particles on the catalyst support particles is such that the supported amount of potassium following calcining in terms of potassium metal is preferably 5% by weight or more, 10% by weight or more or 20% by weight or more and preferably 80% by weight or less, 60% by weight or less or 40% by weight or less based on the weight of the catalyst support particles. This is because, if the amount of potassium is excessively high, basicity increases resulting in a decrease in the activity of a catalytic metal (precious metal such as platinum (Pt), rhodium (Rh), palladium (Pd) or gold (Au)) to be subsequently described. In addition, if the amount of potassium is excessively low, the amount of NOx storage material after calcining may decrease, resulting in the possibility of a decrease in NOx storage performance.

The supported amount of potassium compound particles and other NOx storage material raw materials on the catalyst support particles is such that the supported amount of NOx storage material after calcining in terms of the metal element that composes the NOx storage material is preferably 5% by weight or more, 10% by weight or more or 20% by weight or more and preferably 80% by weight or less, 60% by weight or less or 40% by weight or less based on the weight of the catalyst support particles. This is because, if the amount of potassium and other NOx storage material raw materials is excessively high, there is the possibility of a decrease in the activity of the catalytic metal to be subsequently described. In addition, if the amount of potassium and other NOx storage material raw materials is excessively low, the amount of NOx storage material after calcining decreases, resulting in the possibility of a decrease in NOx storage performance.

Step (B)

In step (B) of one embodiment of the present disclosure, potassium compound particles and other NOx storage material raw materials are formed into a NOx storage material such as potassium carbonate by calcining the catalyst support particles supporting the potassium compound particles.

In step (B), there are no particular limitations on the calcining temperature and calcining time provided the temperature and time are sufficient for decomposing and removing impurities and optional protective agents and the like as well as supporting a catalytic metal on a catalyst support. For example, in an air atmosphere, the calcining temperature is preferably 300° C. or higher, 350° C. or higher or 400° C. or higher, and preferably 800° C. or lower, 700° C. or lower or 600° C. or lower. In addition, calcining time is preferably 30 minutes or more, 1 hour or more or 2 hours or more, and preferably 10 hours or less, 8 hours or less or 6 hours or less.

In step (B), the catalyst support particles supporting the potassium compound particles may be dried prior to calcining. Drying can be carried out under reduced pressure or normal pressure at a temperature of 80° C. to 250° C. for 1 hour to 24 hours. In addition, drying may be carried out using microwaves and the like.

Other Steps

The method for producing a NOx storage-reduction catalyst in one embodiment of the present disclosure may also comprise a step for supporting a catalytic metal on the catalyst support particles before step (A), between step (A) and step (B), or after step (B).

There are no particular limitations on the catalytic metal in one embodiment of the present disclosure, and a material typically known to be used as a catalytic metal in the technical field of NOx purification catalysts can be used. Examples thereof can include precious metals such as platinum (Pt), rhodium (Rh), palladium (Pd) and gold (Au). Supporting these catalytic metals on the catalyst support particles makes it possible to remarkably improve not only NOx storage capacity and purification performance, but also the oxidative activity of CO and HC.

The supported amount of catalytic metal is such that the supported amount of catalytic metal after calcining in terms of the catalytic metal is typically 0.01% by weight or more, 0.1% by weight or more or 0.5% by weight or more, and 10% by weight or less, 5% by weight or less or 3% by weight or less based on the weight of the catalyst support particles from the viewpoint of being able to promote the oxidation-reduction reaction of NOx.

There are no particular limitations on the method used to support the catalytic metal, and a method for typically supporting catalytic metal on catalyst support particles in the technical field of NOx purification catalysts can be used. Examples of the method include an impregnation method consisting of supporting the catalytic metal by impregnating the catalyst support particles into an aqueous solution containing an acetate or nitrate of the metal that composes the catalytic metal, a co-precipitation method consisting of adding a basic substance such as aqueous ammonia to the aqueous solution to co-precipitate the catalytic metal followed by subjecting the resulting precipitate to heat treatment, a method consisting of adding a reducing agent such as an alcohol to the aqueous solution and heating as necessary while simultaneously reducing ions of each metal element contained in the aqueous solution, and a reduction precipitation method. Among these, an impregnation method consisting of supporting the catalytic metal by impregnating the catalyst support particles into an aqueous solution containing an acetate or nitrate of the metal that composes the catalytic metal is preferable from the viewpoint of facilitating dispersion of the catalytic metal on the surface of the catalyst support particles.

There are no particular limitations on the timing at which the catalytic metal is supported on the catalyst support particles, and the catalytic metal can be supported on the catalyst support particles before step (A), between step (A) and step (B) or after step (B). In particular, the catalytic metal is preferably supported on the catalyst support particles before supporting the potassium compound particles on the catalyst support particles from the viewpoint of NOx storage performance being maintained by the potassium compound.

The catalyst support particles supporting the potassium compound particles and optional other NOx storage material raw material particles and/or the catalytic metal can be coated onto the honeycomb substrate. For example, a prescribed binder and the like can be added to the catalyst support particles supporting the potassium compound particles or other NOx storage material raw material, or the catalytic metal, to prepare a slurry followed by coating the slurry onto the honeycomb substrate.

There are no particular limitations on the timing at which the catalyst support particles supporting the potassium compound particles and optional other NOx storage material raw material or the catalytic metal are coated onto the honeycomb substrate. For example, the catalyst support particles may be coated onto the honeycomb substrate prior to step (A), or in other words, prior to supporting the potassium compound particles and optional other NOx storage material raw material on the catalyst support particles, or the catalyst support particles supporting the potassium compound particles may be coated onto the honeycomb substrate between step (A) and step (B). In particular, the catalyst support particles supporting the potassium compound particles are preferably coated onto the honeycomb substrate between step (A) and step (B). This is because the state in which the potassium compound particles are dispersed and supported on the catalyst support particles is easily adjusted prior to coating onto the honeycomb substrate.

The honeycomb substrate is composed of ceramics such as cordierite and SiC and has a honeycomb shape. The honeycomb shape can have a straight flow structure or wall flow structure.

In a NOx storage-reduction catalyst produced according to the production method of one embodiment of the present disclosure, the particle diameter of potassium-containing NOx storage material particles in the catalyst layer of the storage-reduction catalyst is such that the average particle diameter is preferably 20 nm or more, 25 nm or more or 30 nm or more from the viewpoint of less susceptibility to lowering of the melting point. In addition, the average particle diameter is preferably 50 nm or less, 45 nm or less or 40 nm or less from the viewpoint of being able to increase specific surface area to improve NOx storage performance.

Particle diameter in one embodiment of the present disclosure refers to the diameter of a particle, and in the case the particle is not spherical, refers to the maximum diameter of the particle.

The average particle diameter of the potassium-containing NOx storage material particles can be measured with, for example, a scanning transmission electron microscope (STEM). In this case, after having dispersed a powder having the potassium-containing NOx storage material supported thereon in a solvent such as ethanol, the dispersion is dropped into a copper grid followed by drying, and the resulting powder may then be used to measure the particle diameter of the potassium-containing NOx storage material particles. Average particle diameter is preferably calculated by randomly selecting a plurality of particles from an image obtained with STEM followed by measuring the particle diameters thereof. The number of measured particles (n) is preferably 5 or more and more preferably 10 or more.

EXAMPLES

Example

1. Synthesis of Catalyst Powder (Support of Catalytic Metal)

50 mL of distilled water were placed in a 500 mL beaker followed by the addition of 17 g of an aqueous solution of dinitrodiammine platinum nitrate (Pt concentration: 8.5% by weight) and dissolving therein. Continuing, 231.5 g of $Al_2O_3$—$ZrO_2$—$TiO_2$ complex oxide particles (AZT Support, Sakai Chemical Industry Co., Ltd.) were added followed by heating and evaporative drying. The particles were then crushed after drying overnight at 120° C. The crushed powder was transferred to a crucible followed by calcining for 2 hours at 750° C. to obtain supported Pt/AZT particles having a Pt concentration of 0.63% by weight.

2. Slurry Preparation

Binders in the form of 9.9 g of Dispal 14/7 and 4.8 g of 5% hydroxyethyl cellulose (HEC) were prepared followed by dissolving in 161 g of distilled water. Subsequently, 159.8 g of a catalyst powder in the form of the aforementioned Pt/AZT particles and 28.2 g of potassium compound particles in the form of oteracil potassium were added followed by crushing with a ball mill to prepare a slurry.

3. Coating onto Honeycomb Substrate

The aforementioned slurry was wash-coated (coated amount: 6.3±0.31 g) onto a monolithic test piece (φ30 mm×50 mm, 4 mil, 400 square cells) and dried followed by calcining for 1 hour at 500° C. to obtain a catalyst test piece.

Comparative Example 1

1. Synthesis of Catalyst Powder (Support of Catalytic Metal)

Pt/AZT particles were obtained in the same manner as the above Example.

2. Slurry Preparation

A slurry was prepared in the same manner as the example with the exception of using 29.2 g of potassium compound particles in the form of potassium hydrogen tartrate (solubility in water: 600 mg/100 ml $H_2O$) instead of the oteracil potassium used in "2. Slurry Preparation" of the above Example.

3. Coating onto Honeycomb Substrate

A catalyst test piece was obtained according to the same method as the example using the slurry of Comparative Example 1.

Comparative Example 2

1. Preparation of Aqueous Solution of K—Ti Complex Precursor 1.5 moles of citric acid having a multidentate ligand were dissolved in ion exchange water followed by heating to 75° C. 0.3 moles of titanium isopropoxide were added to this solution followed by cooling to room temperature after dissolving, to prepare an aqueous titanium citrate complex solution (0.57 mol/L). 0.6 ml of a 30% aqueous hydrogen peroxide solution were then added to 6.15 ml of the resulting aqueous titanium citrate complex solution. Moreover, 1.64 ml of an aqueous potassium acetate solution (4.26 mol/L) were added followed by stirring to prepare an aqueous solution of a K—Ti complex precursor. At this time, the molar ratio of Ti and K in the aqueous solution (Ti/K) was 0.5 and the K and Ti were believed to be complexed in a fine state.

2. Slurry Preparation

Binders in the form of 39.7 g of aluminum nitrate nonahydrate and 4.5 g of Catapal D (nitrate-based acidic binder, Vista Chemical Co.) were prepared followed by dissolving in 183 g of distilled water. Subsequently, 159.8 g of a catalyst powder in the form of the aforementioned Pt/AZT particles were added followed by crushing with a ball mill to prepare a slurry.

3. Support of NOx Storage Material and Coating onto Honeycomb Substrate

The aforementioned slurry of Comparative Example 2 was wash-coated (coated amount: 6.3±0.31 g) onto a monolithic test piece (φ30 mm×50 mm, 4 mil, 400 square cells) and calcined at 250° C. followed by supporting in the aforementioned aqueous K—Ti complex precursor solution (0.15 mol/L) by water absorption. This was then dried followed by calcining for 1 hour at 500° C. to obtain a catalyst test piece.

High-Temperature Durability Test

A high-temperature durability test was carried by cycling between lean and rich burning for 5 hours under the conditions shown in Table 1 in order to evaluate the NOx purification performance of the catalyst test pieces of Example and Comparative Examples 1 and 2 before and after the high-temperature durability test.

TABLE 1

| | Time (min) | Temperature (° C.) | Gas Composition |
|---|---|---|---|
| Lean conditions | 5 | 800 | $O_2$: 5% |
| Rich conditions | 5 | 800 | CO: 2% |

The catalyst test pieces of Example and Comparative Examples 1 and 2 before the high-temperature durability test and after the high-temperature durability test were filled into a fixed bed flow reactor followed by alternately passing lean exhaust gas and rich exhaust gas through the catalyst test pieces (gas flow rate: 15 L/min) under the conditions shown in Table 2 at temperatures of 250° C., 300° C., 350° C., 400° C. and 450° C. NOx purification rates were calculated from the NOx concentration at the inlet and the NOx concentration at the outlet during the lean and rich cycles. The results are shown in FIGS. 2 and 3.

Figure 2:
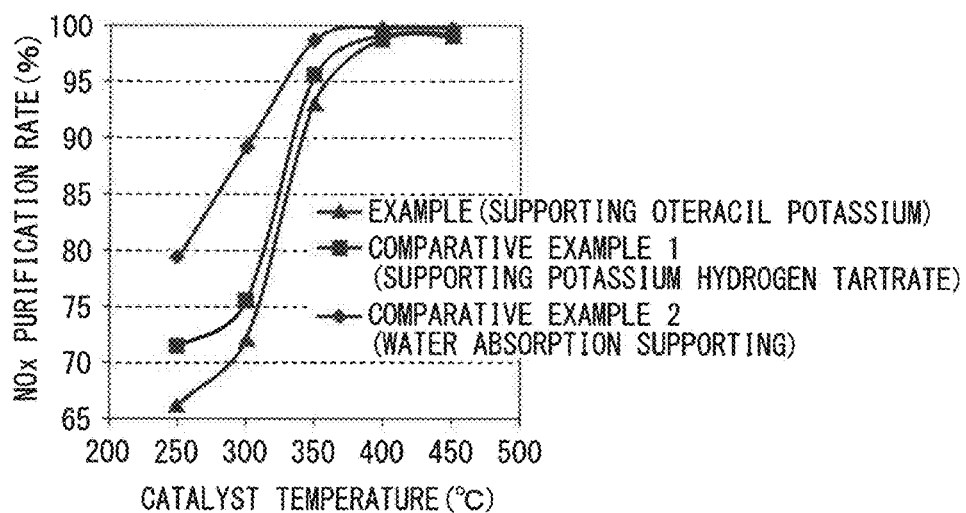
FIG. 2 indicates NOx purification rates of the NOx storage-reduction catalysts of Example and Comparative Examples 1 and 2 in an unused state.
Figure 3:
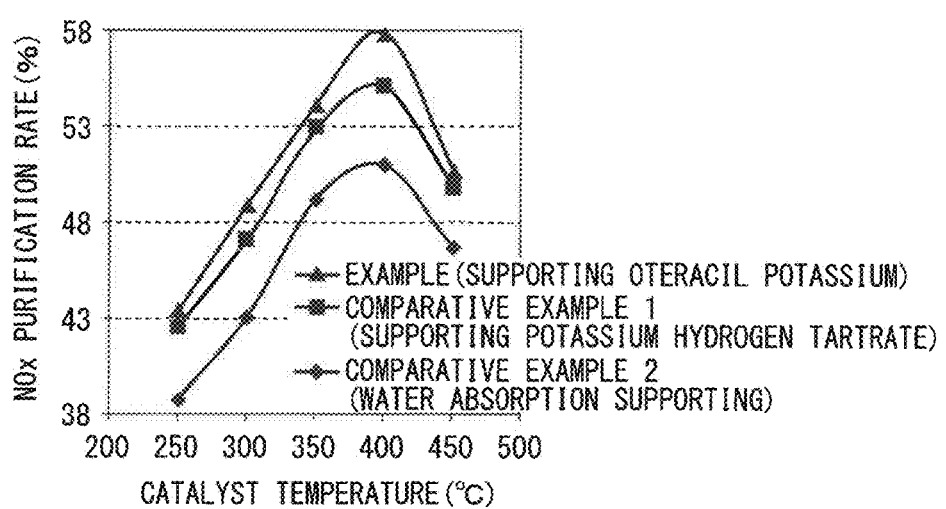
FIG. 3 indicates NOx purification rates of the NOx storage-reduction catalysts of Example and Comparative Examples 1 and 2 after a high-temperature durability test.

As indicated by the results shown in FIG. 2 which is obtained by evaluating those catalyst test pieces not being subject to the high-temperature durability test, the NOx purification rate of the NOx storage-reduction catalyst of Example was lower than that in Comparative Examples 1 and 2 over a temperature range of 250° C. to 450° C. As indicated by the results shown in FIG. 3 which is obtained by evaluating those catalyst test pieces being subject to the high-temperature durability test, the NOx purification rate of the NOx storage-reduction catalyst of Example was, on the other hand, higher than that in Comparative Examples 1 and 2 over a temperature range of 250° C. to 450° C. On the basis thereof, the NOx storage-reduction catalyst of Example can be understood to demonstrate the greatest inhibition of decreases in NOx purification rate attributable to exposure to high temperatures.

TABLE 2

| | Time (s) | $CO_2$ (%) | $O_2$ (%) | CO (%) | $C_3H_6$ (ppm) | $H_2$ (%) | NO (ppm) | $H_2O$ (%) | $N_2$ |
|---|---|---|---|---|---|---|---|---|---|
| Lean conditions | 60 | 10 | 7 | 0 | 600 | 0 | 400 | 4 | Balance |
| Rich conditions | 6 | 10 | 0 | 0.75 | 1500 | 0.25 | 400 | 4 | Balance |

Potassium Distribution Analysis cube measuring 1 cm on a side were cut out from the catalyst test pieces of Example and Comparative Examples 1 and 2 followed by embedding in epoxy resin and polishing the surface with alcohol to obtain analysis samples. The analysis samples were then analyzed for potassium distribution status in NOx storage-reduction catalysts by using an electron probe micro analyzer (EPMA, Machs-2000, Shimadzu Corp.). The results are shown in FIGS. 4A, 4B, and 4C.

A line analysis was carried out to measure the amount of potassium migrating from the catalyst layer to the honeycomb substrate as a result of subjecting to a high-temperature durability test. In the distribution of potassium atoms in the NOx storage-reduction catalysts of Example and Comparative Examples 1 and 2 obtained with the EPMA (FIGS. 4A, 4B, and 4C), a line was drawn to as to include the location of the honeycomb substrate as shown in FIG. 4C followed by measurement of the concentration of potassium atoms on that line. The results are shown in FIGS. 5A, 5B, and 5C.

In the Comparative Examples 1 and 2 respectively shown in FIGS. 5B and 5C, potassium concentration was confirmed to have increased more in the honeycomb substrate after the high-temperature durability test than before the high-temperature durability test. On the other hand, in Example shown in FIG. 5A, there was hardly any difference observed in potassium concentration in the honeycomb substrate between before the high-temperature durability test and after the high-temperature durability test, thus demonstrating that migration of potassium into the honeycomb substrate was inhibited.

Line analyses as shown in FIGS. 5A, 5B, and 5B were carried out at five locations (n=5), and the amounts of potassium in the honeycomb substrate before and after the high-temperature durability test were measured from the area of the concentration of the portion corresponding to the honeycomb substrate. The amount of migration of potassium into the honeycomb substrate was then calculated from the difference in the amounts of potassium before and after the high-temperature durability test. The results are shown in Table 3 and FIG. 6.

As shown in Table 3, the amount of migration of potassium from the catalyst layer into the honeycomb substrate in Example was lower than that in Comparative Examples 1 and 2. Since potassium that has migrated into the honeycomb substrate does not contribute to NOx storage, the NOx purification rates of Comparative Examples 1 and 2 after the high-temperature durability test were much lower than that of Example as shown in FIG. 3. Since migration of potassium from the catalyst layer to the honeycomb substrate is inhibited in Example, the decrease in NOx purification rate is believed to be able to be inhibited to a greater degree than in Comparative Examples 1 and 2.

TABLE 3

| | Amount of potassium before high-temperature durability test (unused state) [—] | Amount of potassium after high-temperature durability test [—] | Amount of potassium migrating from catalyst layer to honeycomb substrate [—] |
|---|---|---|---|
| Example | 0.105 | 0.207 | 0.102 |
| Comparative Example 1 | 0.12 | 0.232 | 0.112 |
| Comparative Example 2 | 0.101 | 0.252 | 0.151 |

Particle Diameter of NOx Storage Material Particles

Powder of the catalyst layer was scraped from the catalyst test pieces, and after dispersing the resulting powder in ethanol, the dispersion was dropped onto a Cu grid and dried. The dried powder was observed with an aberration-corrected scanning transmission electron microscope (Cs-Corrected STEM: HD-2700, Hitachi, Ltd., acceleration voltage: 200 kV). The average particle diameters of 15 randomly selected potassium-containing NOx storage material particles (n=15) are shown in FIG. 7 for the NOx storage-reduction catalysts of Example and Comparative Examples 1 and 2.

Figure 6:
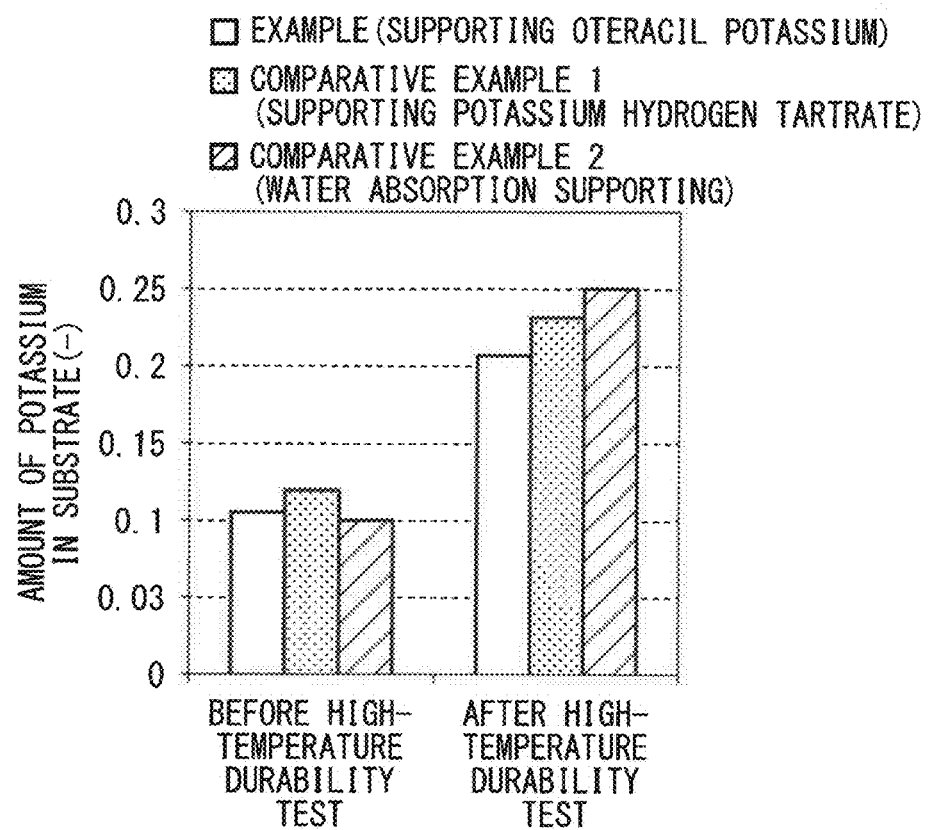
FIG. 6 indicates the amounts of potassium atoms in a honeycomb substrate in an unused state and after a high-temperature durability test in Example and Comparative Examples 1 and 2.
Figure 7:
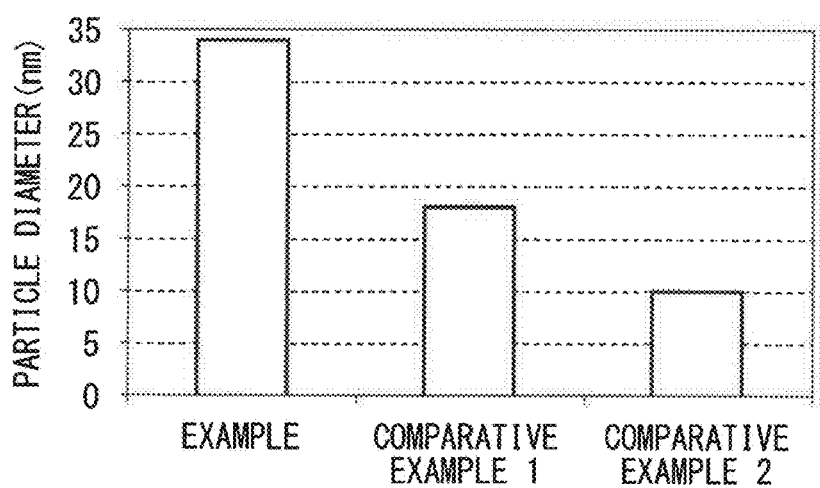
FIG. 7 indicates the particle diameter of potassium-containing NOx storage material particles in the NOx storage-reduction catalysts of Example and Comparative Examples 1 and 2 following exposure to high temperatures.

As shown in FIGS. 6 and 7, the average particle diameter of the NOx storage material particles of Example was larger in comparison with that of Comparative Examples 1 and 2. Since a large average particle diameter makes it possible to inhibit lowering of the melting point of potassium carbonate and optional other potassium-containing NOx storage material particles, the potassium carbonate does not melt at high temperatures, and this is believed to make it possible to inhibit migration of potassium to the honeycomb substrate. Since potassium can be retained in the catalyst layer even after exposure to high temperatures as a result thereof, decreases in NOx purification rate following exposure to high temperatures are believed to be able to be inhibited.

Figure 8A:
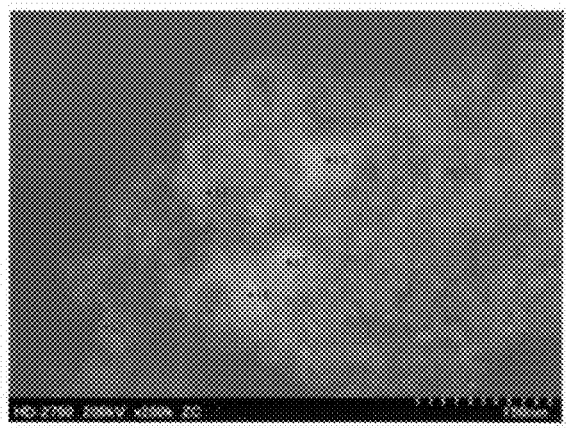
FIGS. 8A, 8B, and 8C indicate the results of TEM observation of NOx storage materials following a high-temperature durability test in Example, Comparative Example 1, and Comparative Example 2, respectively.
Figure 8B:
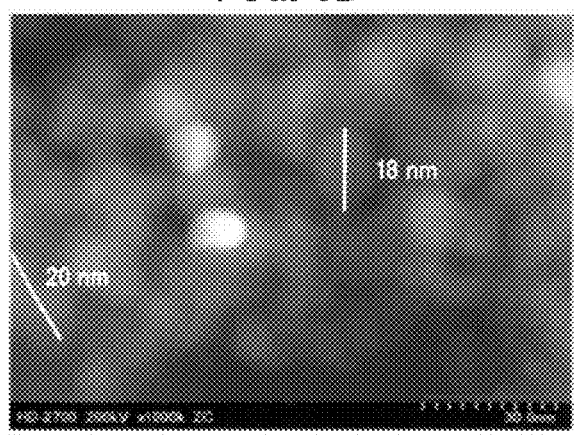
Figure 8C:
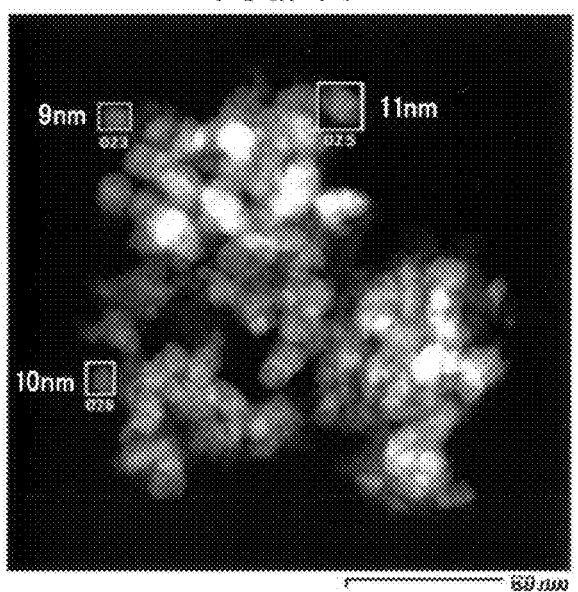

Furthermore, in the above description, the potassium-containing NOx storage material particles of Example and Comparative Examples 1 and 2 following the high-temperature durability test were observed with the aforementioned scanning transmission electron microscope, and the resulting STEM micrographs are shown in FIGS. 8A, 8B, and 8C, respectively.

BRIEF DESCRIPTION OF THE REFERENCE NUMERALS

1 Potassium compound particles
2 Potassium ions
3 Potassium-containing NOx storage material particles having large particle diameter
4 Potassium-containing NOx storage material particles having small particle diameter
5 Catalyst support particles

What is claimed is:

1. A method for producing a NOx storage-reduction catalyst, comprising:
   (A) supporting potassium compound particles on catalyst support particles by using a potassium dispersed water containing the potassium compound particles, and
   (B) calcining the catalyst support particles supporting the potassium compound particles;
   wherein the potassium compound particles are at least one selected from the group consisting of oteracil potassium, potassium tetranitroacridone, potassium tetraphenylborate, and potassium tetranitrophenothiazine-9-oxide.

2. The method according to claim 1, comprising supporting a catalytic metal on the catalyst support particles before the step (A), between the step (A) and the step (B), or after the step (B).

3. The method according to claim 2, further comprising:
   supporting the catalytic metal on the catalyst support particles before the step (A), and
   preparing a slurry by mixing the potassium dispersed water with the catalyst support particles having the catalytic metal supported thereon, to support the potassium compound particles on the catalyst support particles in the step (A).

4. The method according to claim 1, further comprising coating the catalyst support particles supporting the potassium compound particles, on a honeycomb substrate, between the step (A) and the step (B).

5. The method according to claim 1, wherein the average particle diameter of the calcined potassium compound particles is 20 nm to 50 nm after the step (B).

6. The method according to claim 2, further comprising coating the catalyst support particles supporting the potassium compound particles, on a honeycomb substrate, between the step (A) and the step (B).

7. The method according to claim 3, further comprising coating the catalyst support particles supporting the potassium compound particles, on a honeycomb substrate, between the step (A) and the step (B).

8. The method according to claim 2, wherein the average particle diameter of the calcined potassium compound particles is 20 nm to 50 nm after the step (B).

9. The method according to claim 3, wherein the average particle diameter of the calcined potassium compound particles is 20 nm to 50 nm after the step (B).

10. The method according to claim 4, wherein the average particle diameter of the calcined potassium compound particles is 20 nm to 50 nm after the step (B).

11. The method according to claim 6, wherein the average particle diameter of the calcined potassium compound particles is 20 nm to 50 nm after the step (B).

12. The method according to claim 7, wherein the average particle diameter of the calcined potassium compound particles is 20 nm to 50 nm after the step (B).

* * * * *